United States Patent
Hoffstaedter et al.

(10) Patent No.: US 8,651,364 B2
(45) Date of Patent: Feb. 18, 2014

(54) COMPOSITE METAL OBJECT AND METHOD FOR PRODUCING A COMPOSITE OBJECT

(75) Inventors: Norbert Hoffstaedter, Icking (DE); Markus Spring, Eschlikon (CH)

(73) Assignee: Eisfink Max Maier GmbH & Co. KG (DE)

( * ) Notice: Subject to any disclaimer, the term of this patent is extended or adjusted under 35 U.S.C. 154(b) by 417 days.

(21) Appl. No.: 12/742,820

(22) PCT Filed: Nov. 12, 2008

(86) PCT No.: PCT/EP2008/065423
§ 371 (c)(1),
(2), (4) Date: Aug. 10, 2010

(87) PCT Pub. No.: WO2009/062980
PCT Pub. Date: May 22, 2009

(65) Prior Publication Data
US 2010/0297463 A1    Nov. 25, 2010

(30) Foreign Application Priority Data
Nov. 13, 2007   (DE) .......................... 10 2007 054 071

(51) Int. Cl.
*B23K 20/00* (2006.01)
(52) U.S. Cl.
USPC .......................... 228/193; 228/194; 228/234.1
(58) Field of Classification Search
None
See application file for complete search history.

(56) References Cited

U.S. PATENT DOCUMENTS

| | | | | |
|---|---|---|---|---|
| 2,834,102 A | * | 5/1958 | Pflumm et al. | 228/196 |
| 3,019,513 A | * | 2/1962 | Hornaday, Jr. et al. | 228/116 |
| 3,210,840 A | | 10/1965 | Ulam | |
| 3,564,585 A | * | 2/1971 | Camp | 148/531 |
| 4,046,305 A | * | 9/1977 | Brown et al. | 228/194 |
| 4,200,217 A | * | 4/1980 | Imai et al. | 228/161 |

(Continued)

FOREIGN PATENT DOCUMENTS

| | | |
|---|---|---|
| CN | 1730223 A | 2/2006 |
| CN | 101028668 A | 9/2007 |

(Continued)

OTHER PUBLICATIONS

Derwent-Acc-No. 1976-23951X which corresponds to SU-473045A (date 1976).*

(Continued)

*Primary Examiner* — Kiley Stoner
(74) *Attorney, Agent, or Firm* — McCormick, Paulding & Huber LLP

(57) ABSTRACT

A strip-shaped or plate-shaped composite metal object and a method for the production thereof. The composite metal object has at least two layers of the same metal. The layers have been brought by a heat pretreatment to a temperature such that a mutual diffusion bond has resulted through subsequent pressing of the layers against one another, while reducing the thickness by 5 to 25% and preferably 8 to 15%. A layer, which on the side thereof facing an adjacent layer has strip-shaped recesses, which are closed by the adjacent layer to form channels when the layers are pressed together, is used as one of the layers. The channels in the composite metal object allow the inclusion of additional elements before processed further to form an implement. The channels remain extensively preserved during the production and further processing of the composite model object.

9 Claims, 6 Drawing Sheets

(56) References Cited

U.S. PATENT DOCUMENTS

| | | | |
|---|---|---|---|
| 4,422,569 A * | 12/1983 | Payne et al. | 228/173.6 |
| 4,687,053 A * | 8/1987 | Paulus et al. | 165/133 |
| 5,024,368 A * | 6/1991 | Bottomley et al. | 228/118 |
| 5,322,740 A * | 6/1994 | Ghosh | 428/649 |
| 5,385,204 A * | 1/1995 | Boardman et al. | 165/170 |
| 5,431,327 A * | 7/1995 | Dunford et al. | 228/157 |
| 5,433,835 A * | 7/1995 | Demaray et al. | 204/298.09 |
| 5,711,068 A * | 1/1998 | Salt | 29/889.1 |
| 6,340,415 B1 * | 1/2002 | Raaijmakers et al. | 204/192.12 |
| 6,510,894 B1 * | 1/2003 | Watton et al. | 165/166 |
| 6,619,537 B1 * | 9/2003 | Zhang et al. | 228/194 |
| 6,840,431 B1 * | 1/2005 | Kim | 228/203 |
| 6,968,892 B1 * | 11/2005 | Symonds | 165/165 |
| 2003/0136815 A1 * | 7/2003 | Debaisieux et al. | 228/193 |
| 2004/0154788 A1 * | 8/2004 | Symonds | 165/166 |
| 2005/0077341 A1 | 4/2005 | Larrieu | |
| 2007/0283549 A1 * | 12/2007 | Twigg | 29/428 |
| 2010/0247949 A1 * | 9/2010 | Vandyke et al. | 428/615 |

FOREIGN PATENT DOCUMENTS

| | | |
|---|---|---|
| DE | 1196945 | 3/1966 |
| DE | 3212768 A1 | 12/1983 |
| DE | 3243713 A1 | 6/1984 |
| DE | 102004004459 A1 | 1/2005 |
| FR | 2617423 A | 1/1989 |
| GB | 2241914 A * | 9/1991 |
| JP | 09103360 A | 4/1997 |
| JP | 2002168578 A | 6/2002 |
| JP | 2003291241 A | 10/2003 |
| JP | 2004090082 A | 3/2004 |
| JP | 2004132556 A | 4/2004 |
| JP | 2006346730 A | 12/2006 |
| WO | WO 93/01020 A1 * | 1/1993 |

OTHER PUBLICATIONS

Machine translation of JP-2002-168578A (no date).*
Machine translation of JP-2004-132556A (no date).*
Jellison, J.L. et al., "Solid-State Welding", Welding, Brazing and Soldering; [Metals Handbook], Cleveland, ASM, US, vol. vol. 6, Jan. 1, 1983, pp. 672-691, XP000962744, pp. 672-673; figures 6,8; table 1 pp. 680-681.
Enjo, R. et al., "Diffusion Welding of Al-Cu-Mg Series 2017 Alloy", Transactions of JWRI, Osaka University, Welding Research Institute, Osaka, Japan, vol. 13, No. 2, Jan. 1, 1984, pp. 63-68, XP008064202, ISSN: 0387-4508, p. 68.

* cited by examiner

COMPOSITE METAL OBJECT AND METHOD FOR PRODUCING A COMPOSITE OBJECT

FIELD OF THE INVENTION

The invention refers to a method for producing a strip-shaped or plate-shaped composite metal object comprising at least two layers of metal by means of the heat pre-treatment of the layers to a temperature which is at least the same as the re-crystallization temperature of the metal of at least one of the layers and, by means of subsequent pressing of the layers against one another, to affect a reduction in the thickness thereof, during which reduction the layers undergo a mutual diffusion bonding in the area of their interfaces. The invention also refers to a composite metal object built up of several layers which have a mutual diffusion bonding.

BACKGROUND OF THE INVENTION

A method of the foregoing type is known from the fundamental U.S. Pat. No. 2,718,690 of John B. Ulam from the year 1955, which itself builds on the landmark U.S. Pat. Nos. 1,392,416 and 2,468,206 from the years 1921 and 1949, respectively, by means of which plated material can be produced, which during the production of objects can be hot and cold worked and deep drawn. In particular, the method involves the uniting of dissimilar metals to form an integral structure which can then be rolled, hammered, forged, drawn, pressed and deep drawn without any risk of the individual layers of the two dissimilar metals coming apart. Although the method according to U.S. Pat. No. 2,718,690 deals with the production of plated composite material in which stainless steel is plated with copper, or copper is arranged between steel layers, the patent states that, instead of this, the composite metal could also be of one and the same metal, i.e. only of stainless steel or only of copper. In this known method no kind of bonding agent is used between the individual metal layers—instead, it is the molecular structures of the metals which unite. The individual metal layers are cleaned by mechanical working so as to remove any oxides, dirt, or the like, from the surfaces. The cleaning, which is done advantageously with a grinding disk, produces a perfectly clean, oxide-free surface. This is necessary in order to expose the molecular lattice structure of the metal. The metal layers are then heated to a suitable temperature so that, under pressure, the adjacent surfaces of the metals can diffuse one into the other.

U.S. Pat. No. 3,210,840 of the same inventor concerns the production of composite metal objects made from aluminum and stainless steel by means of roll-bonding. The metal layers, cleaned and placed one above the other, are reduced in thickness after heat pre-treatment as a result of the rolling by 10 to 35% in order to obtain the mutual diffusion bonding. In the heat pre-treatment stage the metal surfaces are heated to a temperature above the re-crystallization temperature of aluminum but below the melting point of aluminum and below the re-crystallization temperature of stainless steel. The diffusion bonding is achieved by pressing the metal layers together during rolling. (The so-called pressing together described here and in the following can be done by forging or simply by pressing instead of by rolling). In the case of the method known from this US patent, before it is pressed together, the stack of metal layers, arranged one above the other, is first welded at the ends so as to hold the individual component parts of the stack, i.e. the metal layers, firmly in place. During the ensuing rolling operation, as a result of which each of the metal layers is reduced in thickness simultaneously by up to 35%, a very high compressive force must be generated, so that the two outer cover layers of stainless steel also undergo a reduction in thickness by up to 35%. The aluminum layer arranged between the cover layers is also pressurized with this very high compressive force. This is probably one of the reasons why no consideration has yet been given in the state of the art to provide channels in the aluminum layers. The state of the art offers various alternatives to the production of such channels. For example, DE 32 12 768 A1 describes a method for the diffusion welding of structural elements made of a high temperature-resistant metallic material, in particular an oxide dispersion-strengthened nickel-iron alloy. The structural elements can be, for example, the turbine blades of a gas turbine. The structural element is made up of two part elements which are formed in such a way that, after the part elements have been joined together, the finished structural element comprises cooling channels. To form the cooling channels, indentations are milled into the two part elements before they are connected, and it is these which later form the cooling channels. The alloy, from which the structural element is made, is mainly an iron or nickel alloy.

From DE 10 2004 004 459 A1 a method of producing an active cooling panel made from a thermostructural composite material is known. To produce the panel a metallic coating is formed on the inner side of a first part made of a thermostructural composite material which has hollow embosses which form channels and on the inner side of the second part made of a thermostructural composite material which is intended to be laid against the inner side of the first part. The first and second parts are bonded by connecting the inner sides by means of hot isostatic pressing to form a cooling panel with integrated circulation channels. The thermostructural composite materials are normally composite materials of the type carbon/carbon or with a ceramic matrix made of refractory fibers. The metal of the metallic coating which enables the connection by hot pressing, consists of nickel, copper, iron or an alloy of the same, whereby preferentially nickel or a nickel alloy is used.

From DE 32 43 713 A1 a flat heat exchanger panel and a method of manufacturing it are known. The flat heat exchanger panel consists of two superposed plates between which are provided channels for a medium to be heated or cooled. The two plates consist of a metal which is difficult to be plated or which cannot be plated. Between both plates an amorphous metal fixing layer is provided, namely an alloy of nickel, iron or copper, which enables the plates to be bonded by cold rolling. The fixing layer can be a foil which is inserted between the two plates before cold rolling. The two plates are joined to each other by cold rolling only at those places where the fixing layer is located. The metal strips thus bonded are cut up into single panels. Finally, the recessed sections which have not been joined together are widened to form one or more channels in the usual way.

From DE 1 196 045 B a method is known for producing titanium plated aluminum. In it, the base material, aluminum, is laid, together with the titanium sheets or foils to be plated on to it, to form a bundle, and this bundle is then hot rolled. In so doing, the method is executed in such a way that the two materials to be connected only come together just before rolling and the rolling pressure is set such that the thickness of the base material, the aluminum or the aluminum alloy, is reduced by at least 30%. The titanium sheets or titanium foils to be plated on are not heated, but are rolled in a cold state on to the heated aluminum metal, with the aim of avoiding any oxidation of the titanium sheets. A reduction in thickness during rolling of at least 30% must be achieved in order to obtain an effective bonding strength. After production, the plating product is heated to a temperature of between 480 and 565° C. and rolled again in such a way that the reduction in thickness of the base material, i.e. the layer of aluminum or aluminum alloy, is up to 15%. This is designed to further improve the bonding strength between the aluminum and the titanium. Therefore, the total reduction in thickness of the aluminum base material is at least 45%.

Core layers plated with stainless steel and made of one or more aluminum or aluminum alloy layers are nowadays in widespread use in the manufacture of large grilling plates, where a constant grill temperature needs to be maintained irrespective of the volume of food to be grilled which is laid on the grilling plate. In addition, aluminum plated with stainless steel is mainly used in situations where light but corrosion-resistant metals are required, for example for cookware, but also for applications in the aerospace industry.

SUMMARY OF THE INVENTION

It is an object of the present invention to provide a method for producing a strip-shaped or plate-shaped composite metal object which will considerably increase its range of applications. It is also an object of the present invention to provide a composite metal object with a wider range of applications.

In doing so, the present invention improves point the method known from the above-mentioned U.S. Pat. No. 3,210,840 for the production of a strip-shaped or plate-shaped composite metal object from at least two layers of metal by the heat pre-treatment of the layers at a temperature which is at least the same as the re-crystallization temperature of the metal of at least one of the layers and, by means of the subsequent pressing of the layers against one another, to reduce the thickness thereof, during which reduction the layers undergo a mutual diffusion bonding in the area of their interfaces.

Aluminum or an aluminum alloy can be used in the present invention as the metal for each of the layers, and as one of the layers a layer will be used which on its side facing an adjacent layer is provided with strip-shaped recesses which during pressing together are closed by the adjacent layer, and the reduction in thickness in relation to the total thickness of the layers present before pressing together is up to 25%.

In a method according to the present invention the layers of aluminum or an aluminum alloy can be wound as a strip from a roll, brought up to the corresponding temperature and, for example, pressed together in a rolling mill in such a way that the adjacent layers in each case undergo the desired mutual diffusion bonding. The reduction in thickness in the present invention of up to only 25% and the rolling force required for that are sufficiently small (the latter is smaller than in the method according to the above-mentioned U.S. Pat. No. 3,210,840 by an estimated factor of up to 10), so that during the pressing together the recesses are essentially preserved and form channels in the finished composite metal object which are usable in many ways.

In the case of the composite metal object of the present invention, which is built up of several layers which have a mutual diffusion bonding, each of the layers consists of aluminum or an aluminum alloy, and the composite metal object is interspersed with (in plan view) strip-shaped channels on or in the interface of two adjacent layers. The state of the art assumes that a composite metal object made of different metals, on account of the softness of one or more of the materials to be bonded during the process of pressing together, must be as solid as possible. The inventors have surprisingly found out that, by using aluminum or an aluminum alloy and no other harder metal, such as stainless steel, and by adhering to certain conditions, the compressive forces can be kept sufficiently low and can be distributed sufficiently well during the pressing together, that it is possible to provide recesses or channels. As in the present invention either aluminum or an aluminum alloy is used as the metal for the layers, the composite metal object according to the invention is made of only one metal, namely either of pure aluminum or of an aluminum alloy, and can be used, as has been usual in the past, for example as the core of a grill plate or as the wall or bottom of a cooking device.

As the individual metal layers are united in their molecular structure at their interfaces by means of diffusion bonding, the composite metal object behaves substantially like the single metal and also possesses its strength, so that the composite metal object, preferably after prior annealing, can then be further processed as described at the beginning. Temperature sensors can be introduced into the channels of the composite metal object before further processing or even before the pressing together of the metal layers during production of the composite metal object. Furthermore, instead of this, or in addition to it, the channels can be used to pass through a heating and/or cooling fluid. If the composite metal object is processed to make a grill plate or a cooking device, then during its operation the temperature can be controlled with the help of the temperature sensors integrated into the composite metal object. Advantageously, passive transponders can be used for that which do not need a wire connection to the outside in order to give a reading, nor for their current supply. The composite metal object provided with passive temperature sensors can be used not only as a grill plate but can be further processed generally to form smart devices which, for example, can be radio-controlled.

If, in one embodiment of the method according to the present invention, as a layer with the recesses a layer is used in which the recesses extend over the whole thickness of the layer and form through openings which are closed during the pressing together by the two layers adjacent to their layer, the composite metal object can be produced merely by rolling in the manner described above, whereby the strip-shaped metal layers (sheets) are advantageously wound off rolls.

If, in a further embodiment of the method according to the invention, the recesses or through openings are supplemented by connecting sections to form a meander or the like, a continuous channel can be produced in the composite metal object which can be used like a coil assembly, for example, for heating or cooling purposes. The embodiment as a meander or the like also brings about a good distribution of pressure during the pressing together of the metal layers and in this way protects the recesses better than before from being compressed.

If, in a further embodiment of the method according to the invention, a tubular body made of metal is inserted into the recesses or through openings before the pressing together, which then, by the pressing together, is embedded into the metal of at least one of the layers, the composite metal object can be used for more applications and in particular can be adapted to certain special uses. There are, in fact, applications where only corrosion-resistant and heat-resistant materials such as stainless steel or generally nickel or titanium alloys may come into contact with working fluids.

If, in a further embodiment of the method according to the invention, before or after the pressing together, a further body is introduced into the tubular body in the recesses or through openings, each channel in the composite metal object can be lined to be not only corrosion-resistant and heat-resistant but can at the same time be fitted with a sensor, wiring or the like.

In a further embodiment of the method according to the invention, as the further body, a temperature sensor can be inserted, in particular an RFID chip, a piezo chip or similar intelligent chip, or a Peltier element.

If, in a further embodiment of the method according to the invention, by the pressing together, a reduction of the thickness of the layers from 5 to 25% and preferably from 8 to 15% is created, the composite metal object according to the invention can be produced, for example, with less material and lower energy costs. In addition, in this way it is more certain that during the pressing together the dimensions of the channels will remain as they are, so that any sensors or the like inserted beforehand into the channels are not damaged.

If, in a further embodiment of the method according to the invention, the layers are arranged as core layers between two cover layers of another metal such as stainless steel, copper, or titanium, the total assembly of these layers during the heat pre-treatment is heated up to a temperature which is above the re-crystallization temperature of the core layer metal but below the re-crystallization temperature of the other metal, then by pressing together the total assembly is diffusion bonded with a first reduction in thickness, then the total assembly, in which the cover layers are now bonded to the core layers, by another pressing together under the same heat conditions, undergoes a second reduction in thickness, wherein the first and second reductions in thickness are selected in such a way as to give a total reduction in thickness of the core layers of up to 25%, then the composite metal object according to the invention can be produced as a strip plated with stainless steel or as a plate plated with stainless steel which exhibits a superior bonding strength between the aluminum and the steel, even if the composite metal object is provided with channels.

If, in an embodiment of the composite metal object according to the invention, the composite metal object is brought to a state by heat post-treatment in which it can be further processed by mechanical forming, then various devices can be manufactured without the function of the core structure components being changed. Care must be taken in cases where stainless steel solidifies to too great a degree as a result of the processing, that this solid state can no longer be reversed by subsequent annealing, because the annealing temperature of stainless steel is higher than the melting point of aluminum. Therefore, at the outset, when using stainless steel in the case of the composite metal object according to the invention, every effort is made to keep the forming of the metal and especially its cold forming as low as possible. Additional annealing can also be used to increase the diffusion, i.e. to allow the diffusion zone to penetrate further into the material, whereby a greater bonding strength can be obtained. In the present invention, on account of the formation of the metal of the layers of aluminum or aluminum alloy, there results as required a composite metal object with particularly good heat conducting properties or a particularly light composite metal object.

If, in a further embodiment of the composite metal object according to the invention, the channels extend at least in one of the layers and at least over part of the thickness of this layer, the recesses in the layer(s) can be produced in a chipless way, for example by pressing, or by machining, for example by milling.

If, in a further embodiment of the composite metal object according to the invention, the channels extend at least in one of the layers and at least over the entire thickness of the layer(s), then the recesses which later form the channels can be produced simply but nevertheless very accurately by laser cutting, water jet cutting, or milling.

If, in a further embodiment of the composite metal object according to the invention, the channels extend parallel side by side or over the thickness of the layers at various heights, the composite metal object can be used later in many different ways. For example, a heating or cooling medium can be passed through channels arranged side by side and/or over the thickness of the layers at various heights. Further, the individual channels can be drilled at different places and from outside can be linked together or separated from each other as desired.

If, in a further embodiment of the composite metal object according to the invention, several channels are supplemented by connecting sections to form at least one continuous channel in the form of a meander or the like, then in this case the composite metal object can also be used in many different ways for heating and/or cooling.

If, in a further embodiment of the composite metal object according to the invention, the channels are lined with a tubular body made of metal, the composite metal object can easily be adapted optimally to the foreseen purpose, can for example be lined to be corrosion-resistant for the passage of corrosive fluids.

If, in a further embodiment of the composite metal object according to the invention, a further body is introduced into the channels or into the tubular body, this further body can be designed as a sensor, heating wire or the like, and in this way enable the properties of the fluid to be measured or its temperature to be influenced.

If, in a further embodiment of the composite metal object according to the invention, the further body is a temperature sensor, in particular an RFID chip, a piezo chip or similar intelligent chip or is a Peltier element, the aforementioned embodiment can be realized in a particularly advantageous way.

If, in a further embodiment of the composite metal object according to the invention, the layers of aluminum or an aluminum alloy are arranged between two cover layers of another metal such as stainless steel, copper, or titanium, the composite metal object can be optimally adapted to its intended use, for example with regard to a corrosion-resistant application, a heat-resistant application, a food-resistant application, a salt water-resistant application, or similar.

DESCRIPTION OF THE PREFERRED EMBODIMENT

The invention relates to the production of a strip-shaped or plate-shaped composite metal object which comprises channels or imbedded tubular bodies which increase its range of applications. The steps to be carried out in the production of the composite metal object, which correspond to those of the known method described at the beginning, such as cleaning the metal surfaces, heat pre-treatment of the metal layers and rolling of same with a reduction in thickness so as to obtain a mutual diffusion bonding and a heat post-treatment, if any, will not be described here again in detail. It must be remembered, however, that in the present invention the method involves a reduction in thickness which is as low as possible so that, in the composite metal object according to the invention, not only can channels be incorporated but these channels can have objects inserted in them before the metal layers are pressed together. If, in the method according to the invention, layers of aluminum are bonded together, then, before being pressed together, the surfaces of each aluminum layer are heated to a temperature which is above the re-crystallization temperature of the aluminum but below the melting point of the aluminum. Finally, the composite metal object is annealed, after which it can be further processed and in so doing can be further formed. In this, we refer to the state of the art described at the beginning, in particular to U.S. Pat. Nos. 3,261,724, 3,210,840 and 3,350,772, which deal with methods of rolling for plating aluminum with stainless steel.

Figure 1:
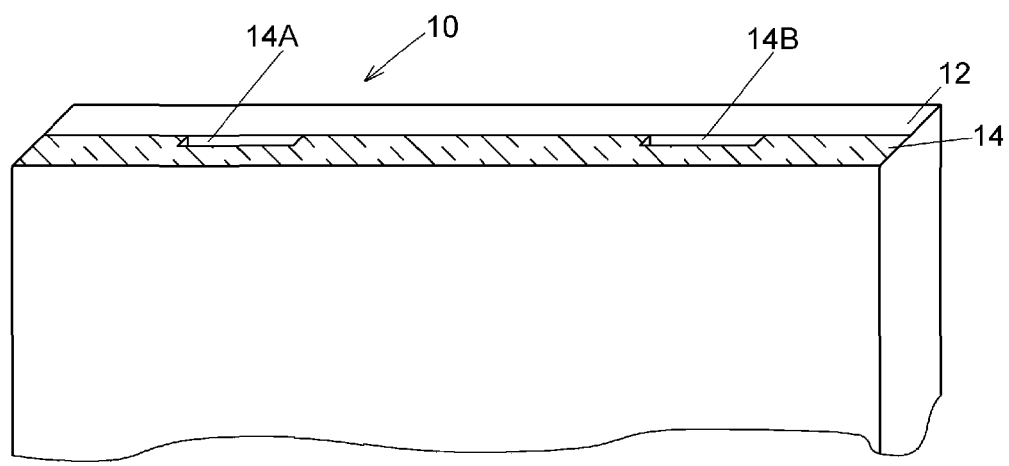
FIG. 1 is a perspective presentation of a partial view of a strip-shaped composite metal object according to the invention built up of two layers from the same metal or from the same metal alloy.
Figure 2:
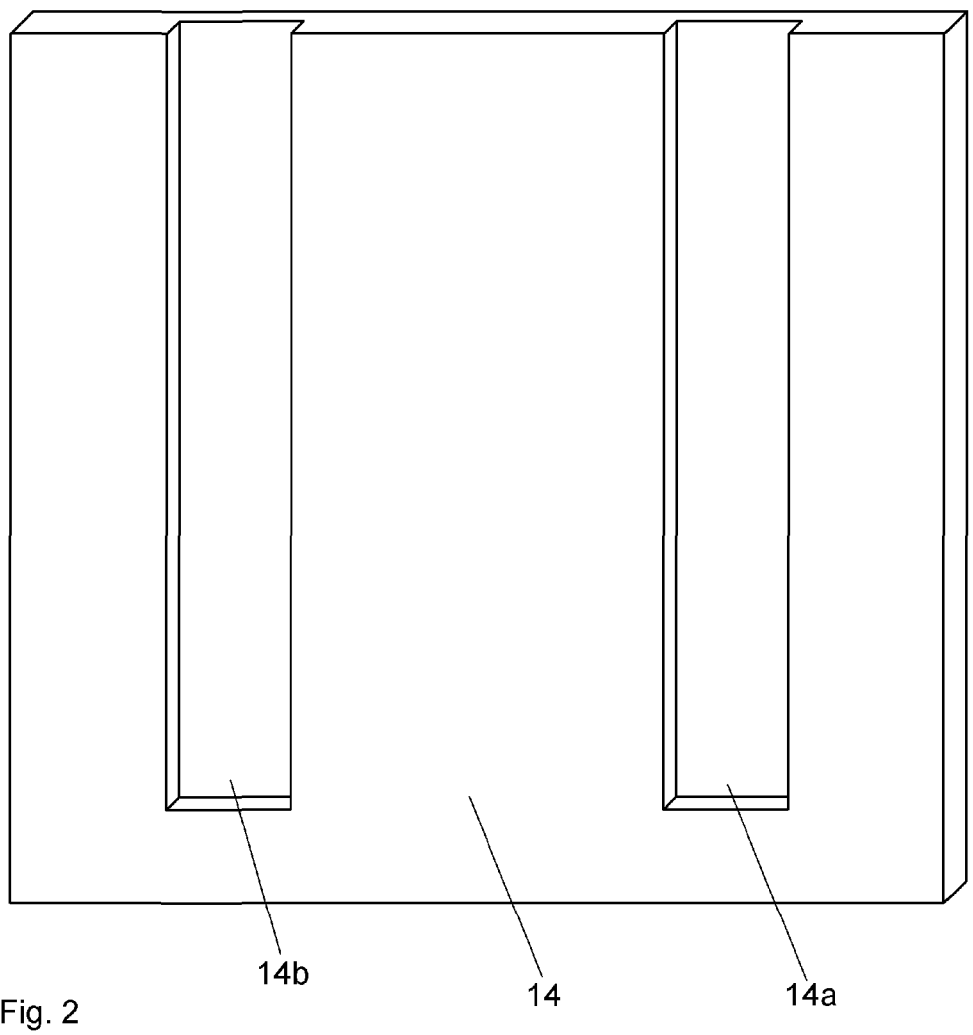
FIG. 2 is a perspective presentation of a partial view of a strip-shaped metal layer provided with recesses for producing the composite metal object according to FIG. 1.

FIG. 1 is a partial view of a first embodiment of a strip-shaped composite metal object labeled collectively as 10. The composite metal object is made up of two layers 12 and 14 made of the same metal. The metal layers 12 and 14 are shown differently for ease of visualization only. In the finished composite metal object 10, the individual layers cannot be distinguished from each other with the naked eye because the metals are the same. A partial view of the strip-shaped metal layer 14 is shown in FIG. 2. Metal layer 14 comprises two strip-shaped recesses 14a, 14b, here parallel to one another. During the rolling process, recesses 14a and 14b are closed by metal layer 12 in their longitudinal extension. Each of the metal layers 12 and 14 can be wound off a roll as a sheet metal strip, cleaned at the surface, brought to its suitable temperature in a heat pre-treatment stage and then united by diffusion bonding in a rolling mill with a reduction in thickness of up to 25% and preferably between 5 and 25% and more preferably between 8 to 15%. Recesses 14a and 14b can be produced by machining, e.g. by milling or chipless, e.g. by pressing.

Figure 3:
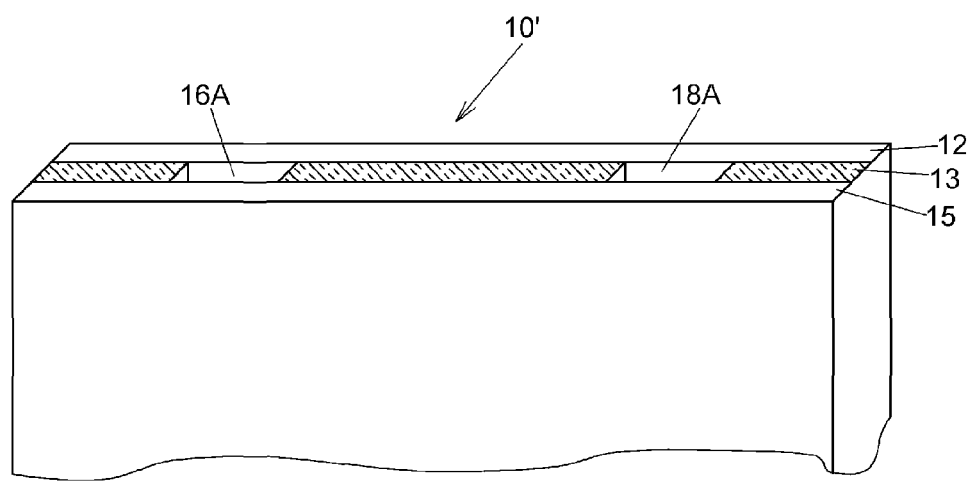
FIG. 3 is a perspective presentation of a partial view of a further embodiment of a strip-shaped composite metal object according to the invention built up of three layers of the same metal or of the same metal alloy.
Figure 4A:
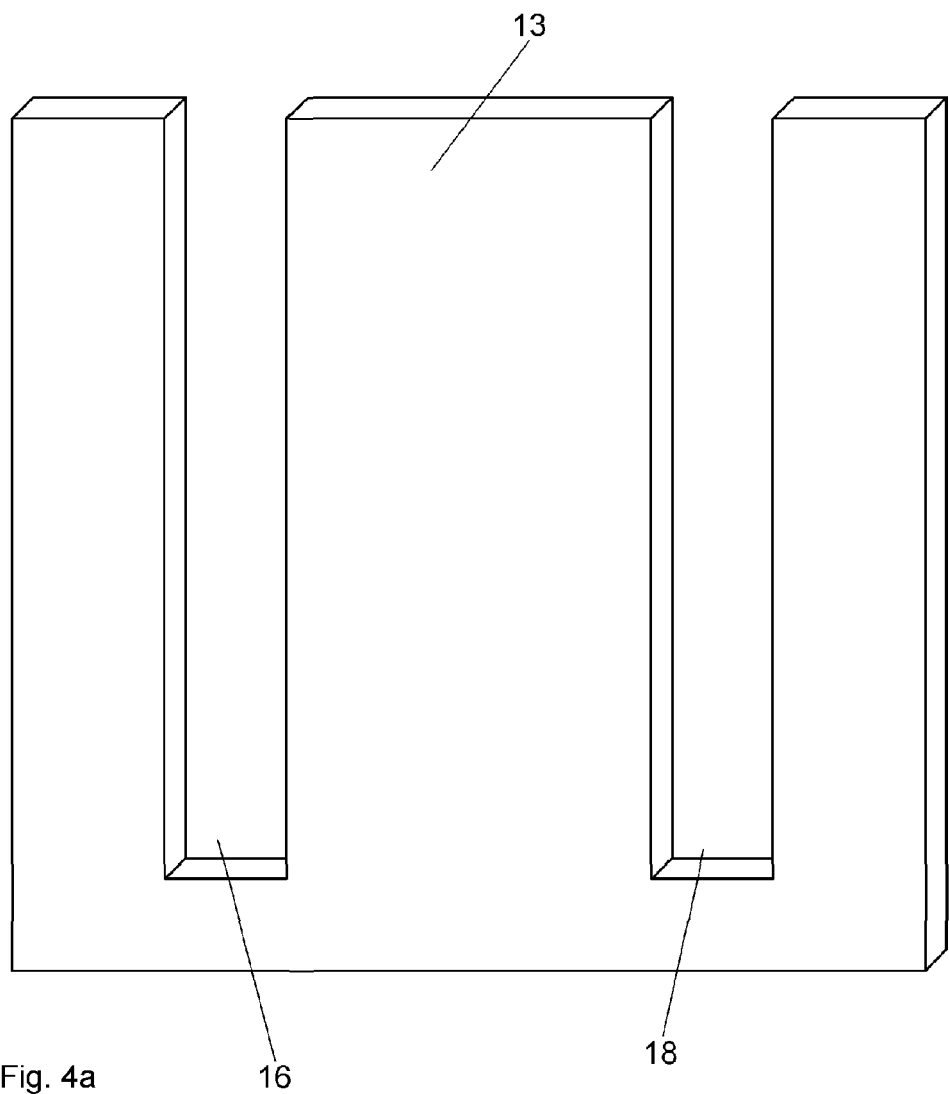
FIG. 4a is a perspective presentation of a partial view of a strip-shaped metal layer provided with strip-shaped through openings for producing the composite metal object according to FIG. 3.
Figure 5A:
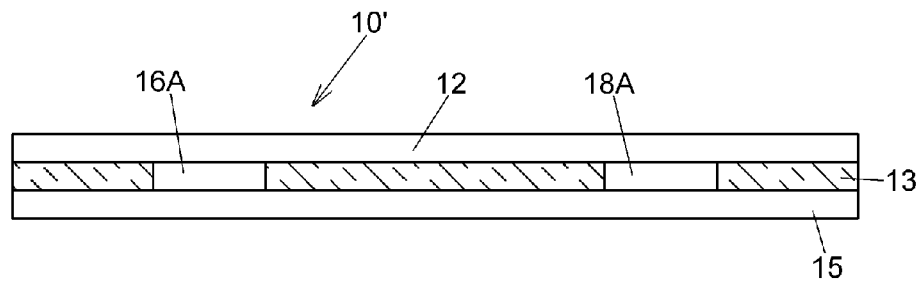
FIG. 5a is a schematic illustration of the composite metal object according to FIG. 3 in a top view on its face.

FIG. 3 shows in a perspective presentation a partial view of a further embodiment of a strip-shaped composite metal object labeled collectively as 10', for which three layers 12, 13, 15 of the same metal are used, of which the middle layer 13 discloses strip-shaped through openings 16, 18, here again parallel to each other, as shown in FIG. 4a. Through openings 16 and 18 produce channels 16A and 18A, respectively, in finished composite metal object 10'. Although in FIG. 3 middle metal layer 13 is likewise shown shaded in order to make it distinguishable from the adjacent metal layers 12, 15, the individual metal layers in the finished composite metal object 10', however, cannot be distinguished from each other with the naked eye, as they are made of the same metal. FIG. 5a shows the face of composite metal object 10' (in top view).

Figure 4B:
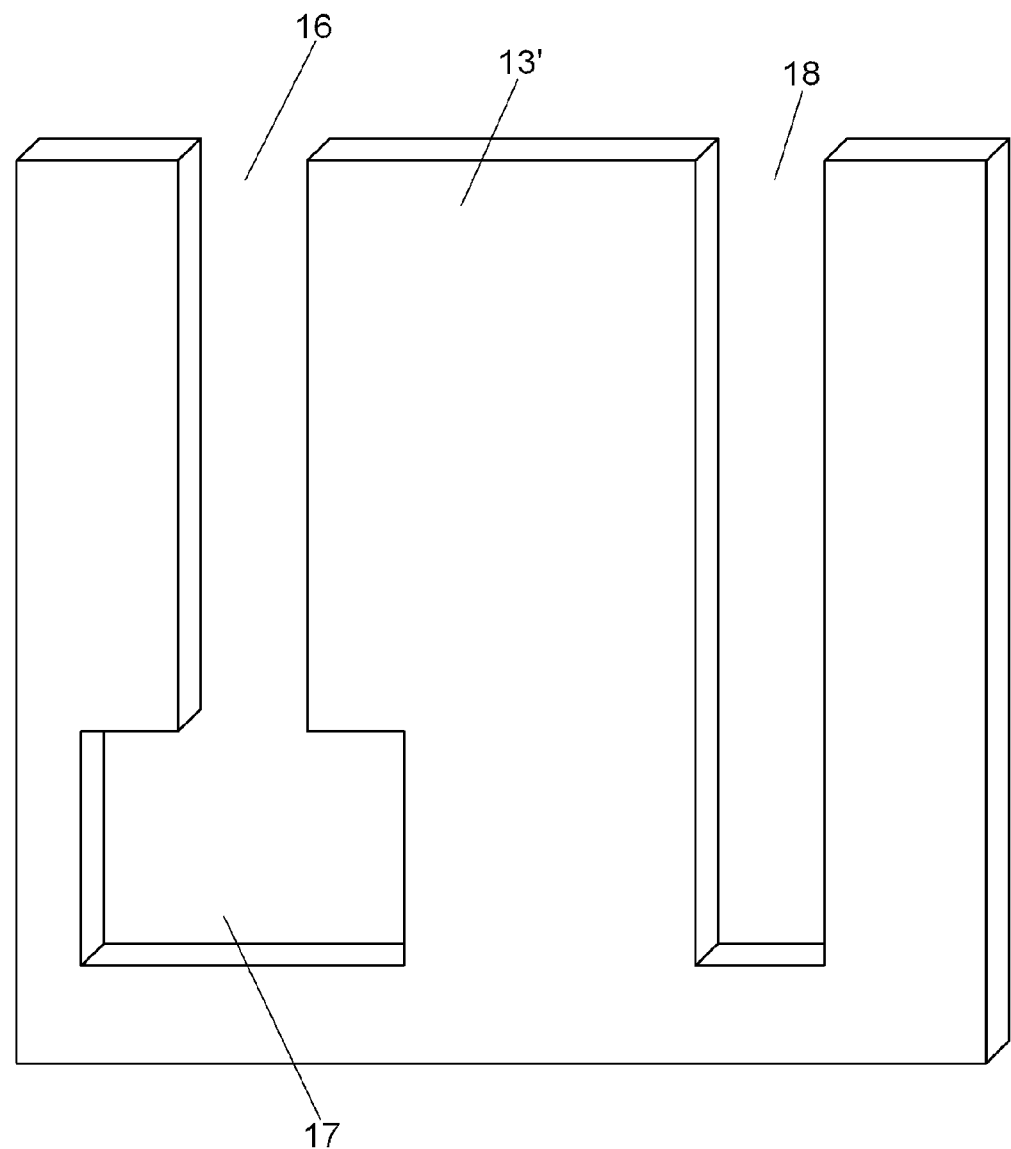
FIG. 4b is a similar representation as in FIG. 4a of an embodiment of a strip-shaped metal layer wherein one of the strip-shaped through openings is enlarged at its end.

FIG. 4b shows, in a view as in FIG. 4a, another embodiment of a strip-shaped metal layer 13' which comprises a strip-shaped through opening 16 which at its end leads into in a considerably enlarged opening 17. In the finished composite metal object in the area of opening 17 therefore there is a dome-shaped extension of through opening 16 which can connect to the external environment via fine perforations in an outer cover layer as in FIG. 5b.

Figure 5B:
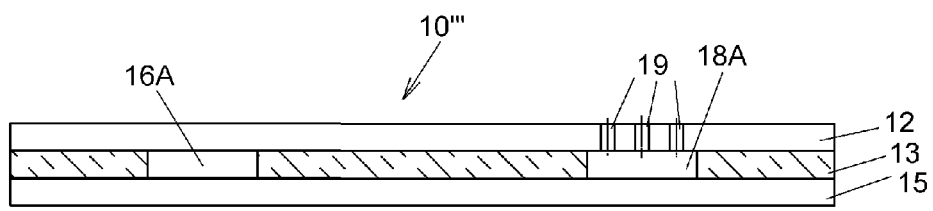
FIG. 5b is a schematic illustration of the composite metal object according to FIG. 5a wherein, however, an upper cover layer comprises fine perforations.

FIG. 5b shows a strip-shaped composite metal object labeled collectively as 10''' whose outer layer 12 in the area of channel 18A is provided additionally with fine perforations 19. Below perforations 19 the extended opening 17 can be situated as in FIG. 4b. If, for example, a cooling liquid is passed through channel 16A, composite metal object 10''' will be generally cooled. If a gas is passed through channel 18A, this gas is cooled in composite metal object 10''' and then escapes via perforations 19 from composite metal object 10'''. In this case it is helpful if, below the perforations, channel 18A widens, i.e. comprises an enlarged opening 17 such as through opening 16 in FIG. 4b.

FIGS. 6a, 6b, 6c and 6d illustrate various possibilities for the use of a tubular body 20, 21, 22, 23 which, for example, has a flat rectangular cross section as in FIG. 6a, a square cross section as in FIG. 6b, a hexagonal cross section as in FIG. 6c and a circular cross section as in FIG. 6d. First, a through opening 16A or a recess 14a can be produced which, however, is adapted to the aforementioned cross sectional form of the tubular body 20, 21, 22 or 23. By the pressing together, the tubular body is then embedded into the metal by one or more metal layers. Before or after the pressing together, a further body 26 or 28 can be introduced into through opening 16A or a recess 14a or into tubular body 20 or 21. The further body 26 can be a temperature sensor, in particular an RFID chip, a piezo chip or similar intelligent chip or a Peltier element, further body 28 for example can be a wire-like sensor or a heating wire.

Figure 6:
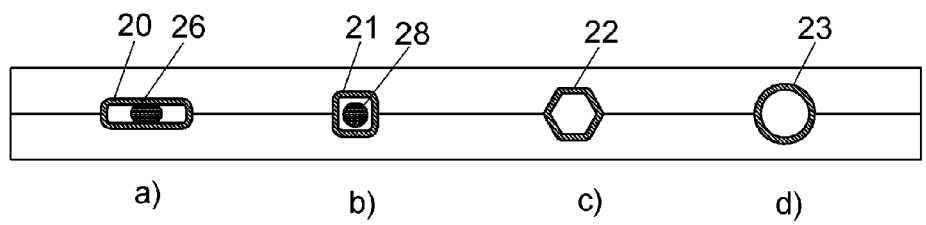
FIG. 6a-d are schematic illustrations of a top view of the face of other embodiments of a composite metal object according to the invention, wherein several possibilities for a lining and insertion of objects in the channels in a composite metal object are depicted schematically side by side.
FIGS. 6e and 6f are schematic illustrations showing embodiments of a composite metal object according to the invention shown separately.

FIG. 6 shows, in views a) to d), a composite metal object 10 which consists of two metal layers 12, 14, or of two metal layers 14, wherein in the latter case each of the channels 14A, 14B is formed in both layers and the channels supplement each other to form a joint channel in which one of the tubular bodies 20, 23 is embedded. FIG. 6 on the other hand illustrates in each of the views e) and f) a part of a composite metal object 10' which comprises a middle layer 13 into which a tubular body 20 or 21 is embedded. The side walls opposite each other of the through openings 16, 18, can be parallel walls in the cases shown in views 6e) and 6f). In such an embodiment of the invention, tubular bodies 22 and 23 can also be used. In this case (not illustrated) it would be advantageous to form the side walls of through openings 16 and 18 in cross section in an angular or circular shape, so that the corresponding tubular body 20 or 21 can be introduced into channels 16A and 18A in a positive locking manner or during the roller plating process can be embedded in a positive locking manner into the metal of the composite metal object.

Figure 7:
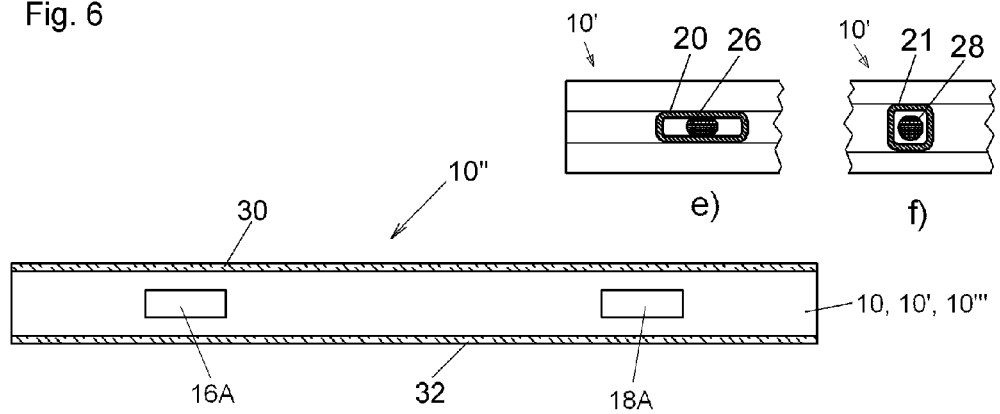
FIG. 7 is a view, in cross section, of a composite metal object in accordance with the invention with two cover layers of stainless steel.

If, as in the present case, layers 12, 14 or 12, 13, 15, consist of aluminum or an aluminum alloy, they can be arranged between two cover layers 30, 32, made of stainless steel, as illustrated in FIG. 7. In this way, composite metal object 10 according to FIG. 1 or 10' according to FIG. 5 can form the core of plated composite metal object 10" according to FIG. 7 arranged between cover layers 30, 32 thereof. During the heat pre-treatment the metals are heated to a temperature which is above the re-crystallization temperature of aluminum but below the re-crystallization temperature of the stainless steel.

In the case of the embodiment according to FIG. 7 for the production of plated composite metal object 10''', the layers of aluminum or aluminum alloy are arranged as core layers between the two cover layers 30, 32, made of another metal, namely stainless steel (or copper, or titanium). The extra reference signs 10, 10', 10''' are designed to illustrate the fact that the core layer arrangement between the two cover layers 30, 32 could consist of the composite metal object 10 according to FIG. 1 or 10' according to FIGS. 3 and 5 or 10''' according to FIG. 5b. For ease of recognition therefore, the lines bordering the individual layers between cover layers 30, 32 in the diagram in FIG. 7 have been left out. During heat pre-treatment the total assembly of these layers is heated to a temperature which is above the re-crystallization temperature of the core layer metal, i.e. the metal between the two cover layers, but which is below the re-crystallization temperature of the other metal i.e. the metal of the two cover layers. Then, in a first step, the total assembly is diffusion bonded by pressing together with a first reduction in thickness. Then the total assembly undergoes a second reduction in thickness—under the same thermal conditions—in a second stage, during which the cover layers are bonded with the core layers by a further pressing together. In so doing, the first and second reductions in thickness are selected in such a way that the total reduction in thickness of the core layers is up to 25%. During this two-step process, advantage is taken of the fact that in the first step the cover layers of stainless steel are not yet bonded to the core layers of aluminum or aluminum alloy. Therefore, in the first stage a degree of forming can be selected for the core layer metal independently of the degree of deformation of the cover layer metal. In the first step after the heat pre-treatment the core layer metal is very soft in comparison to the stainless steel of the cover layers and in this step is therefore substantially the only one which is formed. After the first step, the core layer metal is already bonded in itself and with the cover layer metal. During the forming which occurs in the second stage, the core layer metal and the cover layer metal are each formed with the same reduction in thickness. The reductions in thickness in both steps are thereby selected in such a way that, in total, the core layer metal, i.e. the aluminum or the aluminum alloy, of the core layer does not undergo a reduction in thickness of more than 25%. Since in the first step the reduction in thickness in the cover layer metal is negligibly small, the cover layer metal undergoes a total reduction in thickness in the two steps which is substantially smaller than the reduction in thickness of the core layer metal. Therefore, in the method according to the invention, it is possible to work, in total, with a significantly lower forming force than, for example, in the case of the method according to U.S. Pat. No. 3,210,840 mentioned at the beginning, in which each metal layer is simultaneously reduced in thickness up to 35%. The composite metal object according to the invention, which consists only of aluminum or an aluminum alloy, can therefore be provided additionally with cover layers of a harder metal such as stainless steel without the channels present in the composite metal object being compressed too much thereby. If it is known in advance that the composite metal object at the end will be plated with cover layers of stainless steel or the like, then the initial height of the channels can simply be selected accordingly bigger so that the rated height of the channel is obtained after the second forming step.

Figure 8:
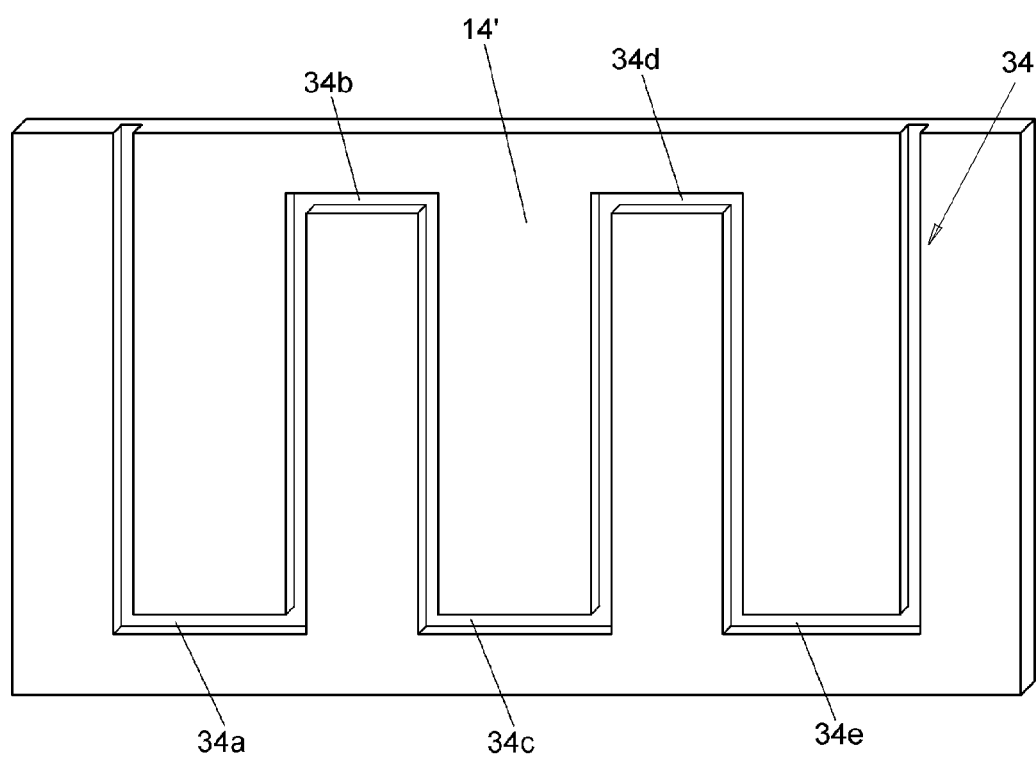
FIG. 8 is a view of a metal layer shaped as a plate with a meander-shaped channel which can form a continuous channel in a composite metal object in accordance with the invention which has a build-up of layers according to FIG. 1.
Figure 9:
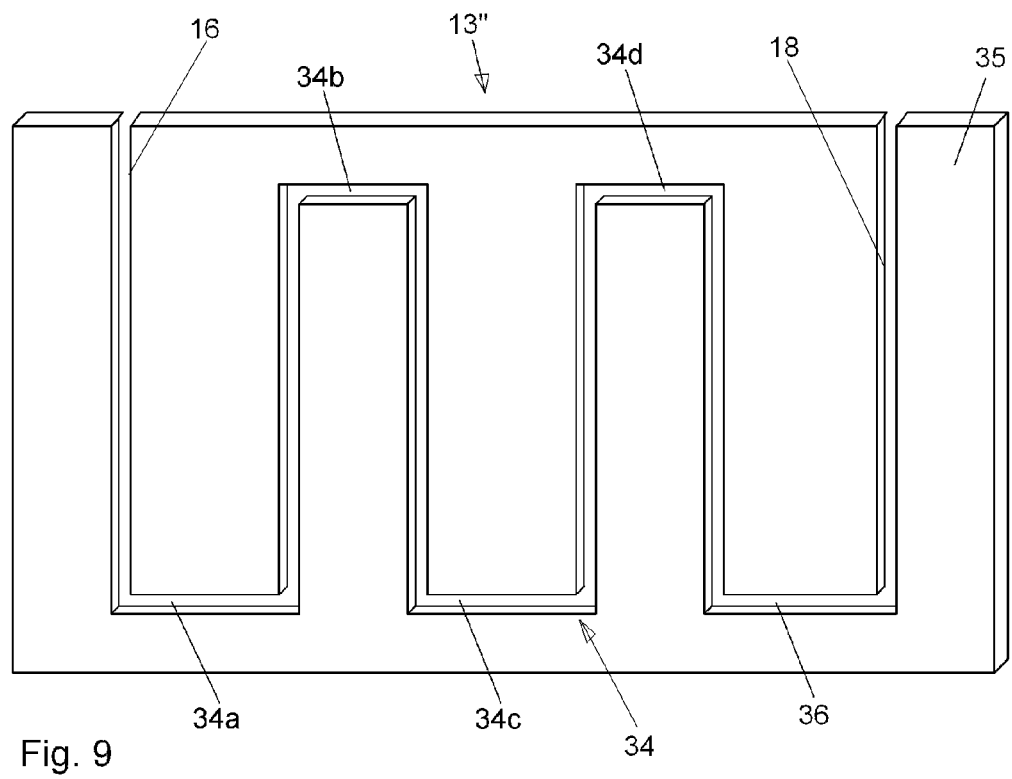
FIG. 9 is a perspective presentation of a partial view of a strip-shaped metal layer as in FIG. 4a which here, however, only has one through opening in the shape of a meander.

Recesses 14a, 14b or through openings 16, 18, instead of being strip-shaped and parallel to each other, can be shaped as a meander 34 as shown in FIGS. 8 and 9. To do this, the strip-shaped recesses as recesses 14a, 14b can be advantageously supplemented as in FIG. 8 by connecting sections 34a-34e, to form meander 34 or a similarly wound structure which then, in a composite metal object such as in FIG. 1, FIG. 5 or FIG. 7 for example, forms a continuous channel. The embodiment as a meander or the like also protects the channels from being overly compressed. This embodiment ensures, namely, an even distribution of pressure when the metal layers are pressed together.

If, as layer 13 with through openings 16, 18, a metal layer is used, marked collectively in FIG. 9 as 13", in which the through openings form a continuous meander 34 which, like through openings 16, 18, are closed during roller plating by the adjacent two layers 12 and 15, the result is a composite metal object with a continuous channel formed by meander 34. In this case, metal layer 13" is advantageously produced of two interlocking comb-like parts as can be seen in FIG. 9. Each of these can be joined at the place where through openings 16, 18, come together in an upper face of metal layer 13", by a bridge, not shown in FIG. 9, which is removed after the roller plating process.

Although in the illustration in the drawings the arrangement is always chosen such that recesses 14a, 14b and channels 14A, 14B and through openings 16, 18, end in the face of one of the composite metal objects 10, 10', 10", or 10''', this is by no means obligatory.

The recesses, through openings and channels can of course also end in the interior of the composite object and can later be made accessible by processing (machining) at a desired point.

Figure 10:
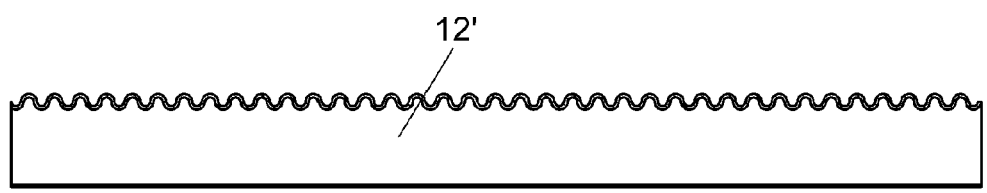
FIG. 10 is a view of a further embodiment of an upper cover layer which has fine grooves on its outer side.

FIG. 10 shows an embodiment of an outer cover layer 12' in which the outer surface is provided with fine grooves. The grooves can be arranged as waves, wherein we do not mean the visible wavy shape shown in section in FIG. 10, but a wavy form of the grooving extending at the level of the outer surface. The grooves can have a depth of up to 5 mm or an even greater depth. They remain intact during the pressing together of the metal layers and increase the surface area of the composite metal object,

LIST OF REFERENCE SIGNS 10 composite metal object
10' composite metal object
10" composite metal object
10''' composite metal object
12 metal layer
13 metal layer
13' metal layer
13" metal layer
14 metal layer
14A channel 14B channel
14a recess
14b recess
14' metal layer
15 metal layer
16 through opening
16A channel
17 enlarged opening
18 through opening
18A channel
19 perforations
20 tubular body
21 tubular body
22 tubular body
23 tubular body
26 further body
28 further body
30 cover layer
32 cover layer
34 meander
34a connecting section
34b connecting section
34c connecting section
34d connecting section
34e connecting section

The invention claimed is:

1. A method for the production of a strip-shaped or plate-shaped composite metal object of at least two layers of metal, the method comprising the steps of:
   heat pre-treatment of the layers at a temperature which is at least the same as the re-crystallization temperature of the metal of at least one of the layers,
   subsequently pressing together the layers, to effect a reduction in thickness thereof, during which the layers in the area of their interfaces undergo a mutual diffusion bonding,
   using, as the metal of each of the layers aluminum or an aluminum alloy, and
   providing one of the layers with strip-shaped recesses on a side of the layer facing an adjacent layer, which during pressing together are closed by the adjacent layer and in that the reduction in thickness in relation to the total thickness of the layers present before pressing together is up to 25%,
   arranging the layers as core layers between two cover layers of another metal such as stainless steel, copper or titanium, and
   heating the total assembly of these layers during the heat pre-treatment to a temperature which is above the re-crystallization temperature of the core layer metal but below the re-crystallization temperature of the other metal,
   the step of pressing comprising the steps of:
      pressing together the total assembly is diffusion bonding with a first reduction in thickness, and
      again pressing together the total assembly to undergo a second reduction in thickness under the same thermal conditions,
      wherein the first and the second reduction in thickness are selected in such a way as to give a total reduction in thickness of the core layers of up to 25%.

2. The method according to claim 1, further comprising the steps of providing a layer with the recesses, in which the recesses extend over the whole thickness of the layer and form through openings which are closed during the pressing together by the two layers.

3. The method according to claim 2, wherein the recesses or through openings are supplemented by connecting sections to form a meander.

4. The method according to claim 3 further comprising the steps of, before the pressing together, inserting a tubular body made of metal into the recesses or through openings which then by the pressing together, is embedded into the metal of at least one of the layers.

5. The method according to claim 4, further comprising the steps of introducing a further body into the tubular body in the recesses or through openings.

6. The method according to claim 5, further comprising the steps of, as the further body, providing a temperature sensor, said temperature sensor being an RFID chip, a piezo chip, or a Peltier element.

7. The method according to claim 1, wherein, by the pressing together, a reduction of the thickness of the layers from 5 to 25% is created.

8. The method according to claim 5, wherein the further body is introduced into the tubular body after the pressing together.

9. The method according to claim 7, wherein a reduction of the thickness of the layers from 8 to 15% is created.

* * * * *

UNITED STATES PATENT AND TRADEMARK OFFICE
CERTIFICATE OF CORRECTION

PATENT NO. : 8,651,364 B2  
APPLICATION NO. : 12/742820  
DATED : February 18, 2014  
INVENTOR(S) : Norbert Hoffstaedter et al.

Page 1 of 1

It is certified that error appears in the above-identified patent and that said Letters Patent is hereby corrected as shown below:

In the Claims

Column 12, Claim 6, line 35, after the words "piezo chip," insert --or a similar intelligent chip,--.

Signed and Sealed this  
Twenty-third Day of December, 2014

Michelle K. Lee  
*Deputy Director of the United States Patent and Trademark Office*